United States Patent [19]
Hartz et al.

[11] Patent Number: 5,604,010
[45] Date of Patent: Feb. 18, 1997

[54] COMPOSITE HONEYCOMB SANDWICH STRUCTURE

[76] Inventors: Dale E. Hartz; David G. Erickson; William B. Hopkins; Christopher L. Pederson, all of The Boeing Company P. O. Box 3707, M/S 13-08, Seattle, Wash. 98124-2207

[21] Appl. No.: 587,160

[22] Filed: Jan. 11, 1996

[51] Int. Cl.$^6$ .................................................. B32B 3/12
[52] U.S. Cl. ........................... 428/118; 428/116; 156/327
[58] Field of Search .................................. 428/116, 118; 156/327

[56] References Cited

U.S. PATENT DOCUMENTS

| | | |
|---|---|---|
| 2,227,212 | 12/1940 | Beck . |
| 2,745,779 | 5/1956 | Ritter et al. . |
| 2,839,442 | 6/1958 | Whitaker . |
| 3,655,818 | 4/1972 | McKown . |
| 3,857,217 | 12/1974 | Reps . |
| 4,162,341 | 7/1979 | Norton . |
| 4,344,955 | 8/1982 | Hammer . |
| 4,353,947 | 10/1982 | Northcutt . |
| 4,622,091 | 11/1986 | Letterman . |
| 4,765,942 | 8/1988 | Christensen et al. . |
| 4,879,152 | 11/1989 | Green . |
| 4,973,508 | 11/1990 | Bretz . |
| 5,061,418 | 10/1991 | Ware . |
| 5,089,328 | 2/1992 | Doerer et al. . |
| 5,135,799 | 8/1992 | Gross et al. . |
| 5,186,999 | 2/1993 | Brambach . |
| 5,234,757 | 8/1993 | Wong . |
| 5,284,702 | 2/1994 | Umemoto et al. . |
| 5,338,594 | 8/1994 | Wang et al. . |
| 5,445,861 | 8/1995 | Newton et al. . |

FOREIGN PATENT DOCUMENTS

| | | |
|---|---|---|
| 0424956 | 5/1991 | European Pat. Off. . |
| 89-016292 | 1/1989 | Germany . |
| 87-112911 | 3/1987 | Japan . |
| 1-171935 | 7/1989 | Japan . |

OTHER PUBLICATIONS

Alteneder, et al., "Processing and Characterization Studies of Honeycomb Composite Structures," from *Proceedings, 38th International SAMPE Symposium and Exhibition*, May 10–13, 1993, Anaheim, California. PCL Internal No. 200–01/93–AW.

Kirk–Othmer, *Encyclopedia of Chemical Technology*, Fourth Edition, vol. 7, pp. 1, 18, and 27–28.

3M Material Safety Data Sheet, 3M PR 500 Molding Resin, Apr. 26, 1992, Document 11–2704–2, pp. 526–529.

"Chemical Handling Requirements", Paper No. A-1330-CHR-0538, Jul. 1, 1992, 1 page.

"Adhesive For Composite Bonding (350 F Cure),"*Boeing Material Specification*, BMS 8–245K, Orig. Issue 6–Jun.–1978, Revised 29–Sep.–1994, pp. 1–17.

Boeing Material Specification, BMS 8–245K, Qualified Products List, Orig. Issue 29–Sep.–1994 QPL Rev: (ORG)29–Sep–1994, pp. 1–2.

Dexter Aerospace, Materials Division, "Material Safety Data Sheet," SYNSNPAND X9899 Printed Jun. 24, 1994, pp. 1–5.

*Primary Examiner*—Christopher Raimund
*Attorney, Agent, or Firm*—John C. Hammar

[57] ABSTRACT

Resin flow into the cells of a honeycomb core in sandwich structures is eliminated by using an unsupported film adhesive, a barrier layer, and a scrim supported adhesive layer between the composite laminate and the core. Superior panels with lighter weights, improved mechanical properties, and more predictable structural performance result by keeping resin in the laminate rather than losing it to the core cells.

6 Claims, 1 Drawing Sheet

COMPOSITE HONEYCOMB SANDWICH STRUCTURE

NOTICE OF GOVERNMENT RIGHTS

The present invention was made during performance of Contract No. F33657-91-C-0006 awarded by the Air Force. The Government has certain rights in the invention.

TECHNICAL FIELD

The present invention relates to composite honeycomb sandwich structure, and particularly to resin impregnated fabric sheets forming outer skins adhered on opposed surfaces of a honeycomb core with an intermediate barrier to eliminate resin flow from the skins to the core.

BACKGROUND ART

Aerospace honeycomb core sandwich panels (having composite laminate skins co-cured with adhesives to the core through autoclave processing) find widespread use today because of the high stiffness-to-weight (i.e., "specific stiffness) and strength-to-weight (i.e., specific strength) ratios the panels afford. Typical honeycomb core sandwich panels are described in U.S. Pat. Nos. 5,284,702; 4,622,091; and 4,353,947, which we incorporate by reference. Altenender et al., *Processing and Characterization Studies of Honeycomb Composite Structures*, 38th Int'l SAMPE Symposium, May 10–13, 1993 (PCL Internal No. 200-01/93-AWA) discusses common problems with these panels, including core collapse (i.e., core crush), skin laminate porosity, and poor tool surface finish. We incorporate this article by reference.

With a high flow resin system, large amounts of resin can flow into the core during the autoclave processing cycle. Such flow robs resin from the laminate, introduces a weight penalty in the panel to achieve the desired performance, and forces over-design of the laminate plies to account for the flow losses. The resin loss from the laminate plies also reduces the thickness of the cured plies which compromises the mechanical performance. To achieve the desired performance and the corresponding laminate thickness, additional plies are necessary with resulting cost and weight penalties. Because the weight penalty is severe in terms of the impact on vehicle performance and cost in modern aircraft and because the flow is a relatively unpredictable and uncontrolled process, aerospace design and manufacture dictates that flow into the core be eliminated or significantly reduced. In addition to the weight penalty from resin flow to the core, we discovered that microcracking that originated in the migrated resin could propagate to the bond line and degrade mechanical performance. Such microcracking potential poses a catastrophic threat to the integrity of the panel and dictates that flow be eliminated or, at least, controlled.

Flow from the laminates to the core occurs because of viscosity reduction of the resin (i.e., thinning) at the elevated processing temperatures. Therefore, prior art attempts to solve the flow problem have generally focused on retaining the ambient temperature viscosity of the resin at the curing temperatures. For example, we might alter the processing cycle to initiate curing of the resin during a slow heat-up, low pressure step to induce resin chain growth before high temperature, high pressure completion. In this staged cure cycle, we would try to retain the resin's viscosity by building molecular weight at low temperatures. Higher molecular weight resins have higher inherent viscosity so they remain thicker and are resistant to damaging flow to the core. Unfortunately, with a staged cure cycle, too much flow still occurs, and the potential problems of microcracking still abound. Also, facesheet porosity might increase beyond acceptable limits. Furthermore, a modified cure cycle increases autoclave processing time. Increased processing time translates to a significant fabrication cost increase with risk of rejection of high value parts at the mercy of uncontrolled and inadequately understood factors.

U.S. Pat. No. 5,445,861 describes sound absorbing composite sandwich structure. The sandwich structures have seven layers as follows:

(1) an outer skin;
(2) a small celled honeycomb or foam core;
(3) a frontside inner septum;
(4) a large celled middle honeycomb core;
(5) a backside, inner septum;
(6) a backside, small celled honeycomb or foam core; and
(7) an inner skin.

We often place tuned cavity absorbers in the middle honeycomb core. Performance of this structure suffers from resin flow to the cells of the honeycomb cores during fabrication for the reasons already discussed and because such flow alters the resonance of the structure. We incorporate this patent by reference.

The process of the present invention eliminates resin (matrix) flow into the honeycomb core for sandwich structure using high flow resin systems and results in reproducibility and predictability in sandwich panel fabrication and confidence in the structural performance of the resulting panel.

SUMMARY OF THE INVENTION

We eliminate resin flow into the core of composite honeycomb sandwich structure using high flow resin systems in the laminate skins by using a scrim-supported barrier film between the fiber-reinforced resin composite laminates and the honeycomb core. Our sandwich structure is lighter for the same performance characteristics than prior art panels because our resin remains in the laminate (skin) where it provides structural strength rather than flowing to the core where it is worthless causing excess weight and potential failure.

We also generally use an unsupported film adhesive between the barrier film and the laminates to bond the laminates to the barrier film. With these layers (which might be combined into one product), we achieve improved performance, can retain the resin in the laminates and thereby reduce excess resin we otherwise need to design into the panels to account for resin flow into the core, and reliably fabricate panels in which we have structural confidence.

DETAILED DESCRIPTION OF A PREFERRED EMBODIMENT

Figure 1:
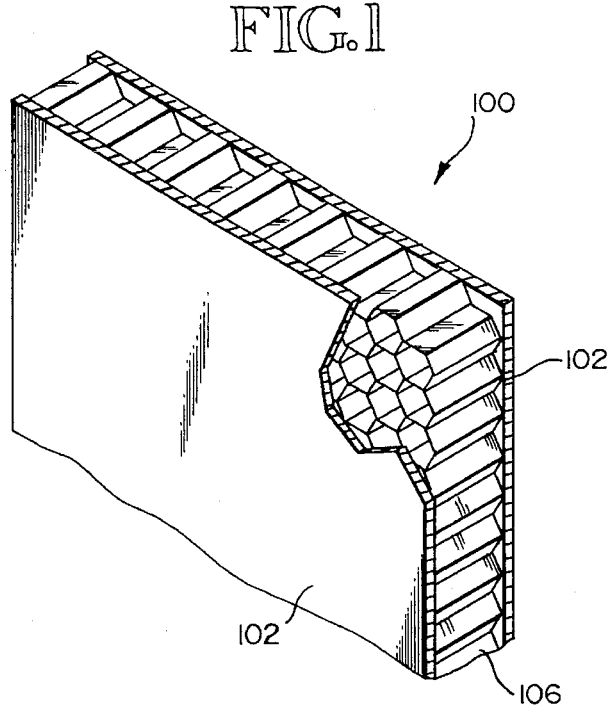
FIG. 1 illustrates a typical composite honeycomb sandwich structure.

The composite honeycomb sandwich panel 100 of the present invention minimizes, eliminates, or significantly reduces resin flow from the laminates to the core, thereby permitting a simpler processing cycle that is more robust for the manufacture of aerospace structure. As shown in FIG. 1, a finished sandwich panel 100 generally has outer facesheets or skins 102 adhered to a central honeycomb core 106. The finished skins 102 comprise laminates of layers of fiber-reinforced organic matrix resin in a cured and consolidated composite form. The core 106 can be paper, synthetic paper, metal, composite, or the like, as appropriate for the application.

To prevent flow of resin from the composite laminate skin to the core, the present invention uses an unsupported film adhesive 108 (FIG. 2), a barrier film 110, and a scrim-supported film adhesive 112 between the skin 102 and the core 106 to keep resin out of the cells 114 of the core 106.

Figure 3:
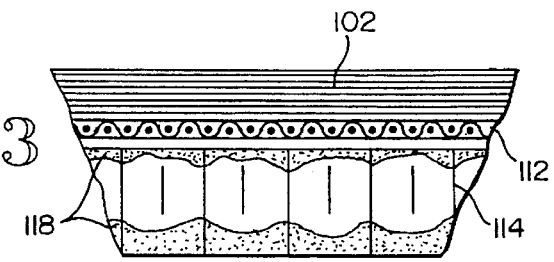
FIG. 3 is a schematic, partial sectional view of sandwich structure suffering resin flow to the core, using a supported film adhesive without a barrier film.

FIG. 3 illustrates the core-filling problems that can result when a film adhesive 112 is used alone without the barrier film 110 and film adhesive 108. Cells 114 of the honeycomb fill with resin 118 which migrates from the laminates and which thereby depletes the resin in the skin 102. Resin depletion impacts structural performance because it reduces ply thickness. Resin depletion increases total weight since the cell resin 118 is simply waste. In all cases, uncontrolled resin flow and depletion makes the panel suspect, especially to microcracking that can begin in the cell resin 118 during thermal cycling and migrate to the fiber-reinforced skin 102, especially at the bond line between the skin 102 and core 106.

Figure 4:
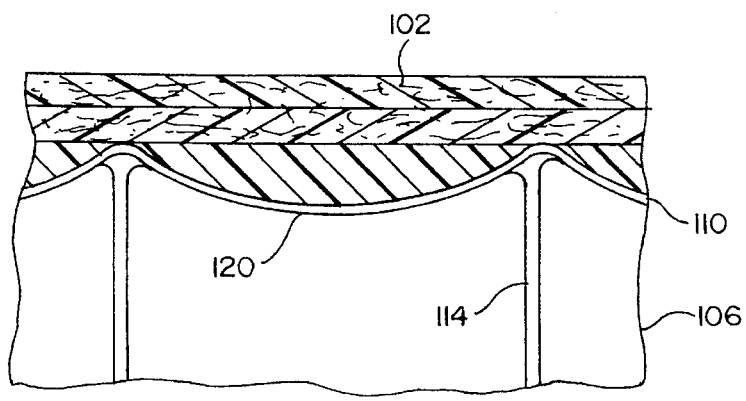
FIG. 4 is another schematic, partial sectional view showing sandwich structure with resin depletion in the skin, but where the resin is prevented from reaching the core with a bulging, unsupported barrier film.

FIG. 4 illustrates undesirable bulging that can occur if we use a barrier film 110 without a scrim-supported film adhesive 112 to try to eliminate cell resin 118. Here, a waste resin bulge 120 protrudes downwardly into the cells 114 of the honeycomb core 106. While the resin is contained in the bulge 120, the skin 102 is still depleted in resin. The flow of resin to bulge 120 imposes structural performance and weight penalties comparable to the uncontrolled condition illustrated in FIG. 3.

Figure 2:
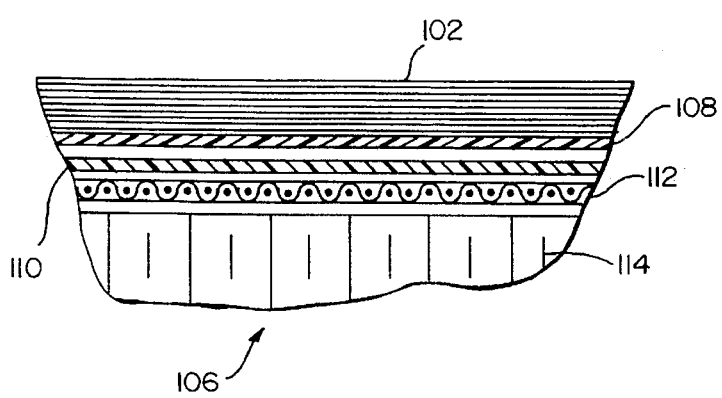
FIG. 2 is a schematic, partial sectional view of the skin-core interface in sandwich structure of the present invention.

As shown in FIG. 2 with the film adhesive 108, barrier film 110, and scrim-supported film adhesive 12, resin flow is checked without cell resin 118 or resin bulges 120.

For bismaleimide laminated skins made with RIGIDITE® 5250-4-W-IM7-GP-CSW, RIGIDITE® 5250-4-W-IM7-GP-CSX, and RIGIDITE® 5250-4-W-IM7-GP-PW prepreg from Cytec Engineered Materials, Inc. (Cytec), the film adhesive 108 preferably is 0.015 psf METLBOND® 2550U adhesive, also available from Cytec. The film adhesive provides additional resin to promote a quality bond between the laminate and barrier film 110. The barrier film 110 preferably is a 0.001 inch thick, bondable grade, surface treated KAPTON® polyimide barrier film capable of withstanding the cure cycle to provide a resin impermeable membrane between the skin 102 and core 106. The scrim preferably is fiberglass, "Style 104" fiber cloth and the film adhesive 112 is 0.06 psf METLBOND® 2550G adhesive, available from Cytec. The scrim-supported film adhesive prevents the barrier film from bulging into the core cells, thereby retaining the resin in the laminate (i.e., skin layers) so that the cured ply thickness is maximized and thereby, we achieve maximum performance at minimum weight for the panels.

The film adhesive 108, barrier film 110, and film adhesive 112 can be purchased as a single item from Cytec as METLBOND® 2550B-0.082 36".

The plies of the skin 102 typically are prepregs of carbon fiber impregnated with bismaleimide thermoset resin, although the invention applies to other high flow resins. Tows might be used in place of the prepreg. The film adhesive 108 should be tailored to achieve an adequate bond between the skin 102 and barrier film 110. The honeycomb core generally is HRP Fiberglass Reinforced Phenolic honeycomb available from Hexcel.

The supported film adhesive and barrier film layers in the sandwich structure also function as corrosion barriers between the skin 102 and core 106 in the case where the core is metal, such as aluminum, and the skin includes a galvanically dissimilar material, such as carbon fiber.

Additional information concerning our preferred panels is presented in our technical paper: Hartz et al., "Development of a Bismaleimade/Carbon Honeycomb Sandwich Structure," SAMPE, March, 1996, which we incorporate by reference.

The panels provide mechanical and physical edgeband properties equivalent to solid BMI/carbon laminate (cured at 0.59 MPa (85 psig)). Our tests confirm that in our panels the edgeband cured-ply-thickness is equivalent to a solid laminate and that the edgeband met the requirements of the solid laminate non-destructive inspection specification. The edgeband and facesheet mechanical performance improved over results we achieved with sandwich structure lacking the scrim-supported adhesive, barrier film, adhesive combination. The flatwise tensile mechanical performance also met design requirements.

We precondition the core to eliminate volatile evolution during curing by heating the core to about 235° C. (455° F.), prior to laying up the sandwich panel. Preconditioning especially for phenolic core, eliminates core-laminate disbonding otherwise caused by outgassing from the core.

While we have described preferred embodiments, those skilled in the art will readily recognize alterations, variations, and modifications, which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. Composite honeycomb sandwich structure, comprising:
   (a) a honeycomb core, having core cells;
   (b) at least one composite laminate having plies of fiber-reinforced matrix resin adhered to the core;
   (c) a film barrier layer between the laminate and the core to bond the laminate and core and to eliminate resin flow from the laminate into the core cells; and
   (d) a film adhesive with supporting scrim between the barrier layer and the core to eliminate resin flow to or sagging of the barrier layer into the core cells.

2. The structure of claim 1 wherein the laminate includes bismaleimide matrix resin.

3. The structure of claim 1 wherein the barrier layer is a bondable grade, polyimide.

4. The structure of claim 2 wherein the film adhesive includes bismaleimide.

5. The structure of claim 4 further comprising an unsupported film adhesive layer between the barrier layer and the laminate.

6. A method for eliminating the flow of resin from laminate skins of a composite honeycomb sandwich panel to cells of the honeycomb comprising the step of:

laminating a resin impermeable barrier film and a scrim supported film adhesive between the skin and honeycomb such that the scrim supported film adhesive is located between the barrier layer and the honeycomb.

\* \* \* \* \*